(12) United States Patent
Onishi et al.

(10) Patent No.: US 9,187,607 B2
(45) Date of Patent: *Nov. 17, 2015

(54) FLAME-RETARDED FOAMABLE STYRENE-BASED RESIN COMPOSITIONS

(75) Inventors: Hideaki Onishi, Kyoto (JP); Hisanori Semori, Kyoto (JP); Masashi Asaoka, Kyoto (JP)

(73) Assignee: DAI-ICHI KOGYO SEIYAKU, CO., LTD., Kyoto-shi, Kyoto (JP)

( * ) Notice: Subject to any disclaimer, the term of this patent is extended or adjusted under 35 U.S.C. 154(b) by 240 days.

This patent is subject to a terminal disclaimer.

(21) Appl. No.: 13/203,789

(22) PCT Filed: Apr. 2, 2010

(86) PCT No.: PCT/JP2010/056054
§ 371 (c)(1),
(2), (4) Date: Aug. 29, 2011

(87) PCT Pub. No.: WO2010/125894
PCT Pub. Date: Nov. 4, 2010

(65) Prior Publication Data
US 2011/0313069 A1    Dec. 22, 2011

(30) Foreign Application Priority Data

Apr. 28, 2009 (JP) .................... 2009-109499
Apr. 28, 2009 (JP) .................... 2009-109561

(51) Int. Cl.
| | | |
|---|---|---|
| C08J 9/35 | (2006.01) |
| C08J 9/00 | (2006.01) |
| C08K 5/00 | (2006.01) |
| C08K 5/06 | (2006.01) |
| C08K 5/136 | (2006.01) |
| C08K 5/3492 | (2006.01) |
| C08K 5/41 | (2006.01) |
| C08L 33/16 | (2006.01) |

(52) U.S. Cl.
CPC ............. *C08J 9/0019* (2013.01); *C08K 5/0066* (2013.01); *C08J 2201/03* (2013.01); *C08J 2325/04* (2013.01); *C08K 5/06* (2013.01); *C08K 5/136* (2013.01); *C08K 5/3492* (2013.01); *C08K 5/41* (2013.01); *C08L 33/16* (2013.01)

(58) Field of Classification Search
CPC .. C08J 9/0019; C08J 2201/03; C08J 2325/04; C08K 5/0066; C08K 5/06; C08K 5/136; C08K 5/3492; C08K 5/41; C08L 33/16
USPC ................ 521/99, 146; 524/466, 577, 578
See application file for complete search history.

(56) References Cited

U.S. PATENT DOCUMENTS

| | | | | |
|---|---|---|---|---|
| 7,468,408 | B2 * | 12/2008 | Onishi et al. ............ 524/88 |
| 2006/0229372 | A1 * | 10/2006 | Onishi et al. ............ 521/99 |
| 2010/0168263 | A1 * | 7/2010 | Onishi et al. ............ 521/146 |

FOREIGN PATENT DOCUMENTS

| | | |
|---|---|---|
| JP | 63-268639 A | 11/1988 |
| JP | 2007-211177 A | 8/2007 |

OTHER PUBLICATIONS

International Search Report, dated May 11, 2010, issued in corrsponding PCT/JP2010/056054.

* cited by examiner

*Primary Examiner* — Irina S Zemel
(74) *Attorney, Agent, or Firm* — Millen White Zelano and Branigan, PC; Csaba Henter; Anthony Zelano

(57) ABSTRACT

In a flame-retarded foamable styrene-based resin composition comprising a bromine-containing flame retardant, the flame retardant is a mixture of (a) an organic bromine-containing compound having a 2,3-dibromopropyl group or an organic bromine-containing compound having a bromine content of greater than 60 wt% in which all bromine atoms are attached to a benzene ring, and (b) an organic bromine compound having a 2,3-dibromo-2-alkylpropyl group. The composition comprises this mixture in amount from 0.5 to 10 parts by weight per 100 parts by weight of the styrene-based resin. The composition exhibits high flame retardant and heat stabilizing effects yet allowing recycling.

22 Claims, No Drawings

FLAME-RETARDED FOAMABLE STYRENE-BASED RESIN COMPOSITIONS

TECHNICAL FIELD

The present invention relates to a flame-retarded foamable styrene-based resin composition and shaped articles produced therefrom.

BACKGROUND ART

Lightweight foamed polystyrene articles have been used in a variety of applications as heat insulation materials for buildings, houses and household electrical appliances and as materials for earth-piling in civil engineering technology.

Polystyrene is consisted of solely carbon and hydrocarbon atoms and very inflammable. Once ignited, polystyrene foams burn rapidly with evolution of black smoke. Consequently, it is imperative in some application fields to impart polystyrene foams with flame retardancy by the addition of flame retardants. Bromine-containing organic compounds are widely used for this purpose. In order to accomplish high flame retardancy with minimum amount of addition, a flame retardant in which all brome atoms are attached to aliphatic carbon atoms such as hexabromocyclo-dodecane (HBCD) is especially effective. However, such a flame retardant exhibits poor heat stability and causes problems such as deterioration and darkening of styrene-based resins, corrosion of processing machines due to generation of hydrogen bromide gas.

Certain flame retardants having high heat stability are known including tetrabromobisphenol A-bis(2,3-dibromopropyl ether). These flame retardants are lower in the flame retardant effect than HBCD and like aliphatic flame retardants and require a larger amount of addition than HBCD and like aliphatic flame retardants to accomplish the same level of flame retardancy. Therefore, the use of large amounts of flame retardants having relatively high heat stability causes problems of decreasing the physical properties of styrene-based resins and increasing the production cost of foamed articles made therefrom.

Polystyrene foams are produced by melting the starting polystyrene together with any desired additives, mixing a blowing agent into the melt and extruding the melt to the atmosphere at a low temperature from an extruding machine. When thermally unstable flame retardants such as HBCD are used to produce flame-retarded polystyrene foam by the above process, deterioration of the polymer such as depolymerization and darkening occurs necessarily. In order to alleviate this problem, it has been proposed in JP 2006316251A to use a heat stabilizing agent together with the flame retardant.

Recently, a demand for recycling of polystyrene foam arises as environmental concern enhances. In the recycled use, polystyrene foams to be recycled are subjected to heating repeatedly and hence require further improved heat stability than required heretofore.

JP 2005139356A proposes to employ tetra-bromobisphenol A-bis(2-methyallyl ether) or tetra-bromobisphenol A-bis (2,3-dibromo-2-methylpropyl ether) when producing polystyrene foams suitable for recycling. However, the polystyrene foams are not satisfactory in the heat stability for recycling.

BRIEF SUMMARY OF THE INVENTION

Problems to be Solved by the Invention

The present invention has been made to solve the foregoing problems. Therefore, it is a principal object of the invention to provide a flame-retarded foamable styrene-based resin composition which is capable of recycling while retaining excellent flame retardancy and heat stability.

Means for Solving the Problems

The present invention provides a flame-retarded foamable styrene-based resin composition comprising a bromine-containing flame retardant and a blowing agent, wherein said bromine-containing flame retardant is a mixture of (a) a bromine-containing organic compound having a 2,3-dibromopropyl group or an organic bromine-containing compound having a bromine content of greater than 60 wt % in which all bromine atoms are attached to a benzene ring, and (b) an organic bromine-containing compound having a 2,3-dibromo-2-alkylpropyl group, and wherein said composition comprises said mixture in an amount from 0.5 to 10 parts by weight per 100 parts by weight of said styrene-based resin.

Effect of the Invention

According to the present invention, it is possible to produced a flame-retarded foamable styrene-based resin composition exhibiting a flame retardancy level equal to or higher than the flame retardancy level achievable with the bromine-containing organic compound (a) or (b) in an amount greater than the total amount of said compounds (a) and (b) when used in combination, and also exhibiting a high heat stability for allowing recycling.

BEST MODE FOR CARRYING OUT OF THE INVENTION

The term "styrene-based resin" as used herein refers to styrene homopolymers and copolymers preferably containing more than 50% of styrene and the balance of a styrene derivative such as o-, m- or p-methylstyrene, 2,4-dimethylstyrene, ethylstyrene, p-(t-butyl) styrene, α-methylstyrene, α-methyl-p-methylstyrene, 1,1-diphenylethylene, p-(N,N-diethylaminoethyl)styrene or p-(N,N-diethylaminomethyl) styrene, and mixtures of styrene homopolymers and copolymers. Typical example is polystyrene.

Also included in the styrene-based resins are a blend of homo- or copolymers of styrene and a rubber-like polymer such as polybutadiene, polyisoprene, styrene-butadiene copolymer, styrene-isoprene copolymer, acrylnitrile-butadiene copolymer, styrene-isobutylene-butadiene copolymer, butadiene-(meth)acrylate copolymer, styrene-butadiene block copolymer, styrene-isoprene block copolymer, butyl rubber, ethylene-α-olefin copolymer (ethylene-propylene rubber), ethylene-α-olefine-polyene copolymer (ethylene-propylene-diene rubber), silicone rubber, acrylate rubber, or hydrogenated diene rubber (hydrogenated styrene-butadiene block copolymer or hydrogenated butadiene copolymer). A mixture of two or more rubber-like polymers may be used. The proportion of the rubber-like polymer in the blend with the styrene homo- or copolymers is preferably less than 30 wt % and more preferably less than 20 wt %.

The bromine-containing flame retardant used in the present invention is a mixture of (a) a bromine-containing organic compound having a 2,3-dibromopropyl group or a bromine-containing organic compound having a bromine content greater than 60 wt % in which all bromine atoms are attached to a benzene ring, and (b) a bromine-containing organic compound having 2,3-dibromo-2-alkylpropyl group, typically 2,3-dibromo-2-methylpropyl group.

Examples of the bromine compound (a) having 2,3-dibromopropyl group include tetrabromo-bisphenol A-bis(2,3-dibromopropyl ether), tetrabromo-bisphenol S-bis(2,3-dibromopropyl ether), tetrabromo-bisphenol F-bis(2,3-dibromopropyl ether), tris(2,3-dibromopropyl)isocyanurate, and tris(2,3-dibromo-propyl)cyanurate. Examples of the bromine compound (a) having a bromine content greater than 60 wt % in which all bromine atoms are attached to a benzene ring include tetrabromobisphenol A, hexabromobenzene, pentabromotoluene, polybromodiphenyl ether, poly-bromo-diphenylethane, bis-polybromophenoxy ethane, tris-polybromophenoxytriazine, polybromophenyl-indane, poly(pentabromobenzyl acrylate), and ethylenebis-tetrabromophthalimide.

Examples of the bromine-containing organic compound (b) having 2,3-dibromo-2-alkyl-propyl group include tetrabromobisphenol A-bis(2,3-dibromo-2-methylpropyl ether), tetrabromobisphenol S-bis(2,3-dibromo-2-methylpropyl ether), and tetra-bromobisphenol F-bis(2,3-dibromo-2-methylpropyl ether).

The proportion of the bromine compound (a) to the bromine compound (b) in the mixture thereof ranges preferably between 10:90 and 90:10, more preferably between 20:80 and 80:20, and especially between 30:70 and 80:20 on weight basis. The heat stability of the composition may be enhanced by the use of a mixture of the bromine compounds (a) and (b) having the proportion within the above range.

According to the present invention, the flame-retarded foamable styrene-based resin composition comprises 0.5 to 10 parts, preferably 0.5 to 6 parts by weight of said mixture of bromine compounds (a) and (b) per 100 parts by weight of the styrene-based resin. Enhanced flame retardancy and heat stability may be imparted to the composition by the addition of said bromine compounds (a) and (b) in combination in a total amount within the above range.

The flame-retarded foamable styrene-based resin composition may optionally comprise a heat stabilizer selected from the group consisting of phosphite, thioether and hindered phenol heat stabilizers to further enhance the heat stability.

Examples of phosphite heat stabilizers include tris(2,4-di-t-butylphenyl)phosphite, bis(2,4-di-t-butylphenyl) pentaerythritol diphosphite, bis[2,4-bis(1,1-dimethylethyl)-6-methylphenyl]ethyl phosphite, tetrakis(2,4-di-t-butylphenyl)-(1,1-biphenyl)-4,4'-diyl bisphosphonite, bis(nonylphenyl)pentaerythritol diphosphite, bis(stearylpentaerythritol)diphosphite, bis(2,6-di-t-butyl-4-methylphenyl)pentaerythritol diphosphite, 2,2'-methylenebis(4,6-di-t-butyl-1-phenyloxy)(2-ethylhexyloxy)phosphorus, tetra(tridecyl)-4,4'-butylidene-bis(2-t-butyl-5-methylphenyl) diphosphite, hexa(tridecyl)-1,1,3-tris(3-t-butyl-6-methyl-4-oxyphenyl)-3-methylpropane triphosphite, di(nonyl)phenyl p-nonylphenyl phosphite, tris(nonylphenyl) phosphite, tetra-($C_{12}$-$C_{16}$) alkyl-4,4'-isopropylidene-(bisphenyl) diphosphite, mono- or diphenyl-mono- or di-($C_8$-$C_{13}$) alkyl phosphite, mono- or diphenyl-mono- or di-($C_8$-$C_{13}$) alkoxyalkyl phosphite, diphenyl isodecyl phosphite, tris(decyl) phosphite, and triphenyl phosphite.

Examples of thioether heat stabilizers include dilauryl 3,3'-thiodipropionate, dimyristyl 3,3'-thiodipropionate, distearyl 3,3'-thiodipropionate, pentaerythritol tetrakis(3-laurylthiopropionate), di(tridecyl) 3,3'-thiodipropionate, and 2-mercapto-benzimidazole.

Examples of hindered phenol compounds include 1,6-hexanediol-bis[3-(3,5-di-tert-butyl-4-hydroxyphenyl)propionate], triethyleneglycol bis[3-(3-tert-butyl-5-methyl-4-hydroxyphenyl) propionate], glycerine tris[3-(3,5-di-tert-butyl-4-hydroxy-phenyl) propionate], pentaerythritol tetrakis[3-(3,5-di-tert-butyl-4-hydroxy-phenyl) propionate], octadecyl-3-(3,5-di-tert-butyl-4-hydroxyphenyl) propionate, thiodiethylenebis[3-(3,5-di-tert-butyl-4-hydroxypheny 1) propionate], N,N'-hexane-1,6-diyl bis[3-(3,5-di-tert-butyl-4-hydroxyphenyl) propionamide], 2,4-dimethyl-6-(1-methylpentadecyl)phenol, diethyl [[3,5-bis(1,1-dimethylethyl)-4-hydroxyphenyl]methyl]phosphonate, calcium diethyl bis[[3,5-bis(1,1-dimethylethyl)-4-hydroxyphenyl]methyl] phosphonate, 3,3',3",5,5',5"-hexa-tert-butyl-a, a', a"-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl) propionate], 1,3,5-tris(3,5-di-tert-butyl-4-hydroxybenzyl)-1,3,5-tri azine-2,4,6-(1H, 3H, 5H)trione, 1,3,5-tris[(4-tert-butyl-3-hydroxy-2,6-xylyl)methyl]-1,3,5-triazine-2,4,6-(1H, 3H, 5H)-trione, and 2,6-di-tert-butyl-4-(4,6-bis(octylthio)-1,3,5-triazin-2-ylamino) phenol.

When added, the amount of heat stabilizer is preferably from 0.01 to 0.5 parts by weight per 100 parts by weight of the styrene-based resin.

The flame-retarded foamable styrene-based resin composition according to the present invention may further comprise an auxiliary flame retardant to further enhance the flame retardant effect of the bromine containing flame retardant. Examples of the auxiliary flame retardants include antimony trioxide, antimony pentoxide, zinc borate, hydrated alumina, and molybdenum oxide. When added, the amount of auxiliary flame retardant is preferably from 0.01 to 5 parts by weight per 100 parts by weight of the styrene-based resin.

It has been known that the flame retardant effect of bromine-containing flame retardants may be enhanced with a free radical generator or a phthalocyanine metal complex. Examples of free radical generators include cumene peroxide, cumene hydroperoxide, di-tert-butyl peroxide, di-t-hexylperoxide, 2,5-dimethyl-2,5-di(t-butylperoxy)hexyne-3, dicumyl peroxide, and 2,3-dimethyl-2,3-diphenylbutane. Examples of phthalocyanine metal complexes include phthalocyamine iron complex, phthalocyanine manganese complex, and phthalocyanine cobalt complex. Dicumyl peroxide, 2,3-dimethyl-2,3-diphenyl-butane and phthalocyanine iron complex are preferable. When used, the amount of free radical generator or phthalocyanine metal complex is preferably from 0.01 to 0.5 parts by weight per 100 parts by weight of the styrene-based resin.

The composition of the present invention may be processed into foamed articles either by the extrusion process or by the beads process. In the extrusion process, a bromine-containing flame retardant is blended with the styrene-based resin together with other additives by heating in an extruder machine to melt the resin, introducing a blowing agent under pressure into the molten mixture and the extruding the molten mixture through a die to the atmosphere. In the beads process, styrene-based resin beads produced by the suspension polymerization process are impregnated with an emulsion containing the bromine-containing flame retardant and various additives other than the blowing agent, and then with the blowing agent under pressure in an autoclave. After drying, the resulting beads are pre-expanded with steam at 100° C. and then transferred into a mold where pre-expanded beads are heated with superheated steam for shaping the foam.

Any of known blowing agents may be employed. Examples thereof include organic volatile blowing agents such as propane, butane, isobutane, pentane, cyclopentane, hexane, cyclohexane, 1-chloro-1,1-difluoroethane, monochloro-difluoromethane monochloro-1,2,2,2-tetrafluoroethane, 1,1-difluoroethane, 1,1,1,2-tetra-fluoroethane, 1,1,3,3,3-pentafluoropropane, dichloro-methane, 1,2-dichloroethane, dimethyl ether, diethyl ether and methyl ethyl ether; inorganic blowing agent such as water, nitrogen gas and carbon dioxide gas; and chemical blowing agents such as azo compounds. Two or more blowing agents may be used in combination. The amount of blowing agent may vary depending upon the properties required for foamed articles and the foaming process. Generally, 0.01 to 0.5 moles, preferably 0.05 to 0.3 moles of the blowing agent are required for 100 parts by weight of styrene-based resin.

A nucleus agent may be used together with the blowing agent for producing foamed articles of the present invention. Examples of such nucleus agents include talc, bentonite, kaolin, mica, silica, clay or diatomaceous earth. The nucleus agent is used 0.01 to 20 parts, preferably 0.1 to 10 parts by weight per 100 parts by weight of the styrene-based resin.

The flame-retarded foamable styrene-based resin composition according to the present invention may optionally comprise a bromine-containing organic compound other than (a) and (b), a silicone compound and hydrated metal compound.

The composition of the present invention may further comprise any of known additives such as light stabilizers, UV absorbing agents, UV stabilizing agents, heavy metal sequestering agents, impact strength enhancing agents, coloring agents, lubricants, drip retardants, crystal nucleus agents, antistatic agents and co-solubilizing agents.

EXAMPLES

The following examples and comparative examples are given to illustrate the present invention without limiting the invention thereto.

1. Materials

The following materials are used in the examples and the comparative examples.

(A) Styrene-Based Resin:
  (A1) GP-PS; PSJ polystyrene G9305, PS Japan Co., Ltd.
  (A2) Polystyrene bead prepared by the following process.

A 5 liter autoclave equipped with a stirrer was charged with 2,000 g of deionized water, 4 g of calcium phosphate and 0.5 g of sodium lauryl benzene sulfonate and the mixture was stirred. To this were added dropwise 2,000 g of styrene monomer containing 6 g of benzoyl peroxide (BPO) dissolved therein with stirring and the suspension process was continued for additional 8 hours at 100° C. The resulting polystyrene beads were recovered by filtration, washed with distilled water, dried, and sieved to collect the beads having particle size from 0.3 to 1.0 mm. The weight average molecular weight (Mw) was determined as 290,000 by the GPC analysis.

(B) Bromine-Containing Organic Compounds:
  (a)-1: Tetrabromobisphenol A-bis(2,3-dibromo-propyl ether), PYROGUARD SR-720, Dai-Ichi Kogyo Seiyaku Co., Ltd.
  (a)-2: Tetrabromobisphenol S-bis(2,3-dibromo-propyl ether), NONEN PR-2, Marubishi Oil Chemical Co., Ltd
  (a)-3: Tris(2,3-dibromopropyl)isocyanurate, TAIC-6B, Nippon Kasei Chemical Co., Ltd.
  (a)-4: 2,4,6-Tris(2,4,6-tribromophenoxy)-1,3,5-triazine, PYROGUARD SR-245, Dai-Ichi Kogyo Seiyaku Co., Ltd.
  (a)-5: 1,2-Bis(2,4,6-tribromophenoxy)ethane, FF680, Chemtura Japan Co., Ltd.
  (a)-6: Tetrabromobisphenol A, FR-1524, ICL-IP Japan Co., Ltd.
  (a)-7: Poly(pentabromobenzylacrylate), FR-1025, ICL-IP Japan Co., Ltd.
  (b)-1: Tetrabromobisphenol A-bis(2,3-dibromo-2-methylpropyl ether), PYROGUARD SR-130, Dai-Ichi Kogyo Seiyaku Co., Ltd.

(C) Heat Stabilizer:
  Mixture of tris(2,4-di-tert-butylphenyl)phosphite and pentaerythritol tetrakis[3-(3,5-di-tert-butyl-4-hydroxyphenyl)propionate, IRGANOX B 225, Ciba Specialty Chemicals Co., Ltd.

(E) Flame Retardancy Enhancer:
  2,3-Dimethyl-2,3-diphenylbutane, NOFMER-BC-90, NOF Corp.

(F) Blowing Agent:
  Isobutane

Foam Nucleus Agent:
  Talc MS, Nippon Talc Co., Ltd.

Other Additive:
  Dioctyl adipate, DOA, Daihachi Chemical Industry Co., Ltd.

2. Preparation of Test Specimens (1) Extrusion Process

A twin-screw extruder system comprising series-connected first extruder having inner diameter (ID) of 65 mm and second extruder having ID of 90 mm was used. All materials shown in Table 1 and Table 2 other than the blowing agent were fed to the first extruder and heated to 200° C. to melt and mix the material thoroughly. The blowing agent was introduced under pressure through a separate line at a location near the forward end of the first extruder. Then the molten materials were continuously transferred to the second extruder, cooled there to a temperature of 120° C. and extruded to the atmosphere through a die having a rectangular shape of 2.5 mm×45 mm size provided at the distal end of second extruder into a foamed extrudate having a rectangular cross-section.

(2) Beads Process

An autoclave equipped with a stirrer was charged with 100 g of distilled water, and flame retardant (B), the heat stabilizer (C), flame retardancy enhancer (E) and nucleus agent in amounts shown in Table 3, respectively. After adding an amount of sodium laurylbenzene sulfonate, the mixture was stirred at room temperature to make a homogeneous emulsion. To this were added 100 g of classified polystyrene beads and the stirring was continued for 5 hours at 100° C. to impregnate the beads with the emulsified additives.

Then 10 g of the blowing agent was introduced into the autoclave under pressure and the mixture was heated to 115° C. for 8 hours with stirring to impregnate the beads with the blowing agent. After separating of water, the beads was heated to 100° C. with steam for pre-foaming. The pre-foamed beads were transferred to a cubic mold and heated to 115° C. with superheated steam to obtain shaped foam specimen.

3. Evaluation Methods (1) Shaping Property

Appearance of shaped foam is visually evaluated according to the following schedule.

Good: A high-quality foam essentially free from cracks, voids or other defects was stably obtained.

Not good: Stable extrusion of foam was not possible due to gas blowing from the die. Cracks, voids or other defects were observed in the foam.

(2) Flame Retardancy

Oxygen index (LOI) was determined according to the method of JIS K 7201.
  Yes: LOT≥26.0
  No: LOI<26.0

(3) Decrease in Molecular Weight

The weight average molecular weight (Mw) of the polystyrene is measured before and after the processing into the foam by the GPC method. Percents decrease in Mw is calculated from the difference before and after the processing.

(4) Recycling Property

The cubic foamed article was sliced into a plurality of flat boards and each board was compressed by passing through a pair of rotating rolls. The compressed board was crashed into coarse particles and kneaded in a laboratory plastomill at 200° C. for 5 minutes. After cooling, the Mw of polystyrene in the resulting mass was determined by the GPC method. Percents decrease in Mw is calculated from the difference before and after the processing.

Yes: More than 70% of the Mw of the starting polystyrene has been retained.

No: The Mw of the starting polystyrene has decreased to less than 70%.

Formulations and evaluation results are shown in the tables below.

TABLE 1

| Material (pbw) | | Exam. 1 | Exam. 2 | Exam. 3 | Exam. 4 | Exam. 5 | Exam. 6 | Exam. 7 |
|---|---|---|---|---|---|---|---|---|
| Resin | A1 | 100 | 100 | 100 | 100 | 100 | 100 | 100 |
| Flame Retardant (B) | (a)-1 | 2.4 | 1.8 | 1.8 | 1.2 | 0.6 | | |
| | (a)-2 | | | | | | 1.8 | |
| | (a)-3 | | | | | | | 1.8 |
| | (b)-1 | 0.6 | 1.2 | 1.2 | 1.8 | 0.4 | 1.2 | 1.2 |
| Heat stabilizer (C) | | 0.2 | | 0.2 | 0.2 | 0.2 | 0.2 | |
| Flame retardancy enhancer (E) | | | | | | 0.1 | | |
| Blowing agent (F) | | 0.1 | 0.1 | 0.1 | 0.1 | 0.1 | 0.1 | 0.1 |
| Nucleus agent | | 1 | 1 | 1 | 1 | 1 | 1 | 1 |
| Shaping property | | Good | Good | Good | Good | Good | Good | Good |
| Flame retardancy | | Yes | Yes | Yes | Yes | Yes | Yes | Yes |
| % Decrease in Mw | | 3 | 12 | 3 | 4 | 3 | 3 | 7 |

TABLE 2

| Material (pbw) | | Comparative Examples | | | | | | | | |
|---|---|---|---|---|---|---|---|---|---|---|
| | | 1 | 2 | 3 | 4 | 5 | 6 | 7 | 8 | 9 |
| Resin | A1 | 100 | 100 | 100 | 100 | 100 | 100 | 100 | 100 | 100 |
| Flame retardant (B) | (a)-1 | 3 | 3 | 8 | | | | 1.2 | 1.2 | 2.4 |
| | (a)-2 | | | | 3 | | | 1.8 | | 3.6 |
| | (a)-3 | | | | | 3 | | | 1.8 | |
| | (b)-1 | | | | | | 3 | | | |
| Heat stabilizer | C | | 0.2 | 0.2 | 0.2 | 0.2 | 0.2 | 0.2 | 0.2 | 0.2 |
| Flame retardancy enhancer | E | | | | | | | | | |
| Blowing agent | F | 0.1 | 0.1 | 0.1 | 0.1 | 0.1 | 0.1 | 0.1 | 0.1 | 0.1 |
| Nucleus agent | | 1 | 1 | 1 | 1 | 1 | 1 | 1 | 1 | 1 |
| Shaping property | | Good | Good | Not Good | Good | Good | Good | Good | Good | Not Good |
| Flame retardancy | | No | No | Yes | No | No | Yes | No | No | No |
| % Decrease in Mw | | 20 | 2 | 3 | 3 | 2 | 20 | 3 | 2 | 3 |

TABLE 3

| Materials (pbw) | | Exam. 8 | Exam. 9 | Exam. 10 | Exam. 11 | Exam. 12 | Exam. 13 |
|---|---|---|---|---|---|---|---|
| Resin | A1 | 100 | 100 | 100 | 100 | 100 | 100 |
| Flame retardancy (B) | (a)-4 | 2.4 | 1.8 | 0.4 | | | |
| | (a)-5 | | | | 1.8 | | |
| | (a)-6 | | | | | 1.8 | |
| | (a)-7 | | | | | | 1.8 |
| | (b)-1 | 0.6 | 1.2 | 0.6 | 1.2 | 1.2 | 1.2 |
| Heat stabilizer (C) | | | 0.2 | 0.2 | 0.2 | 0.2 | 0.2 |
| Flame retardancy enhancer (E) | | | | 0.1 | | | |
| Blowing agent (F) | | 0.1 | 0.1 | 0.1 | 0.1 | 0.1 | 0.1 |
| Nucleus agent | | 1 | 1 | 1 | 1 | 1 | 1 |
| Shaping property | | Good | Good | Good | Good | Good | Good |
| Flame retardancy | | Yes | Yes | Yes | Yes | Yes | Yes |
| % Decrease in Mw | | 5 | 3 | 2 | 3 | 3 | 3 |

TABLE 4

| Material (pbw) | | Comparative Examples | | | | | | | | |
|---|---|---|---|---|---|---|---|---|---|---|
| | | 10 | 11 | 12 | 13 | 14 | 15 | 16 | 17 | 18 |
| Resin | A1 | 100 | 100 | 100 | 100 | 100 | 100 | 100 | 100 | 100 |
| Flame retardant (B) | (a)-4 | 3 | | | | | 1.8 | | | |
| | (a)-5 | | 3 | | | | | 1.8 | | |
| | (a)-6 | | | 3 | | | | | 1.8 | |
| | (a)-7 | | | | 3 | | | | | 1.8 |
| | (b)-1 | | | | | 3 | | | | |
| | (a)-1 | | | | | | 1.2 | 1.2 | 1.2 | 1.2 |
| Heat stabilizer (C) | | 0.2 | 0.2 | 0.2 | 0.2 | 0.2 | | | | |
| Flame retardancy enhancer (E) | | | | | | | | | | |
| Blowing agent (F) | | 0.1 | 0.1 | 0.1 | 0.1 | 0.1 | 0.1 | 0.1 | 0.1 | 0.1 |
| Nucleus agent | | 1 | 1 | 1 | 1 | 1 | 1 | 1 | 1 | 1 |
| Shaping property | | Good | Good | Good | Good | Good | Good | Good | Good | Good |
| Flame retardancy | | No | No | No | No | Yes | No | No | No | No |
| % Decrease in Mw | | 3 | 3 | 4 | 3 | 20 | 3 | 3 | 3 | 3 |

As shown in Tables 1 and 3, the foams of Examples 1-13 produced by the extrusion process are excellent in the shaping property, flame retardancy and heat stability. In contrast, the foams of Comparative Examples 1-5 and 10-14 comprising only one bromine-containing organic compound are not satisfactory at least one of the shaping property, flame retardancy and heat stability as shown in Tables 2 and 4. The foams of Comparative Examples 6-9 and 15-18 comprising two bromine-containing organic compounds free from 2,3-dibromo-2-alkylpropyl group are also not satisfactory at least one of the shaping property, flame retardancy and heat stability as shown in Tables 2 and 4.

TABLE 5

| Material(pbw) | | Example 14 | Comp. Ex. 19 | Comp. Ex 20 |
|---|---|---|---|---|
| Resin A2 | | 100 | 100 | 100 |
| Flame retardant | (a)-1 | 0.7 | 1.5 | |
| (B) | (b)-1 | 0.8 | | 1.5 |
| Blowing agent(F) | | 1 | 1 | 1 |
| Additive DOA | | 1 | 1 | 1 |
| Shaping property | | Good | Good | Not Good |
| Flame retardancy | | Yes | No | Yes |
| Recycling property | | Yes | Yes | No |

As shown in Table 5, the foam of Example 14 produced by the beads process as excellent in all of the shaping property, flame retardancy and recycling property. In contrast, the product of Comparative Examples 19 and 20 comprising only one of flame retardant (a) or (b) is not satisfactory in at least one of shaping, flame retardant and recycling properties.

Industrial Applicability

According to the present invention, it is possible to produce a foamable styrene-based resin composition having enhanced flame retardancy and heat stability yet allowing recycling comprising a small amount of a bromine-containing flame retardant. Therefore, the composition may be used in a wide variety of applications including heat insulation materials for household electrical appliance and for buildings and houses, and materials for earth piling in the civil engineering field.

The invention claimed is:

1. A flame-retarded foamable styrene-based resin composition comprising a bromine-containing flame retardant and a blowing agent, wherein said bromine-containing flame-retardant is a mixture of 25 to 90 wt% of (a) an organic bromine-containing compound having a 2,3-dibromo-propyl group or an organic bromine-containing compound having a bromine content of greater than 60 wt% in which all bromine atoms are attached to a benzene ring, and the balance of (b) an organic bromine-containing compound having a 2,3-dibromo-2-alkylpropyl group, and wherein said composition comprises said mixture in an amount from 0.5 to 10 parts by weight per 100 parts by weight of said styrene-based resin.

2. The composition according to claim 1 wherein said organic bromine containing compound having a bromine content of greater than 60 wt% in which all bromine atoms are attached to a benzene ring is selected from the group consisting of tetrabromobisphenol A, hexabromobenzene, pentabromotoluene, polybromodiphenyl ether, polybromodiphenyl ethane, bis(polybromophenoxy)-ethane, tris(polybromophenoxy)triazine, polybromophenyl-indane, poly(pentabromobenzyl)acrylate, and ethylenebis(tetrabromophthalimide).

3. The composition according to claim 1 wherein said organic bromine-containing compound having a 2,3-dibromopropyl group is selected from the group consisting of tetrabromo-bisphenol A-bis(2,3-dibromopropyl ether), tetrabromobisphenol S-bis (2,3-dibromopropyl ether), tetrabromobisphenol F-bis(2,3-dibromopropyl ether), tris (2,3-dibromopropyl)isocyanurate, and tris(2,3-dirbomo-propyl) cyanurate.

4. The composition according to claim 1 wherein said organic bromine-containing compound having a 2,3-dibromo-2-alkylpropyl group is selected from the group consisting of tetrabromobisphenol A-bis(2,3-dibromo-2-methylpropyl ether), tetrabromobisphenol S-bis(2,3-dibromo-2-methylpropyl ethyl), and tetrabromobisphenol F-bis(2,3-dibromo-2-methylpropyl ether).

5. The composition according to claim 1 further comprising 0.01 to 0.5 parts by weight per 100 parts by weight of said styrene-based resin of a heat stabilizing agent selected from the group consisting of phosphite heat stabilizers, thioether heat stabilizers and hindered phenol heat stabilizers.

6. The composition according to claim 1 further comprising 0.01 to 0.5 parts by weight per 100 parts by weight of said styrene-based resin of a flame retardancy enhancer selected from the group consisting of a phthalocyanine-metal complex and a free radical generator.

7. The composition according to claim 1 further comprising 0.01 to 20 parts by weight per 100 parts by weight of said styrene-based resin of a foam nucleus agent selected from the group consisting of talc, bentonite, kaolin, mica, silica, clay and diatomaceous earth.

8. A shaped plastic foam article obtained from the composition according to claim 1 by the process comprising the steps of melting the composition in an extruder machine, introducing a blowing agent under pressure into the molten composition, and extruding the molten composition to the atmosphere.

9. A shaped plastic foam article obtained by the process comprising the steps of heating the composition according to claim 1 in the form of beads with steam to allow pre-foaming, and then heating the pre-foamed composition in a mold for fully expanding.

10. A flame-retarded foamable styrene-based resin composition comprising a bromine-containing flame retardant and a blowing agent, wherein said bromine-containing flame-retardant is a mixture of
(a) tetrabromobisphenol A, hexabromobenzene, pentabromotoluene, polybromodiphenyl ether, polybromodiphenyl ethane, bis(polybromophenoxy)-ethane, tris(polybromophenoxy)triazine, polybromophenyl-indane, poly(pentabromobenzyl)acrylate, ethylenebis(tetrabromophthalimide), tetrabromo-bisphenol A-bis(2,3-dibromopropyl ether), tetrabromobisphenol S-bis(2,3-dibromopropyl ether), tetrabromobisphenol F-bis(2,3-dibromopropyl ether), tris(2,3-dibromopropyl)isocyanurate, or tris(2,3-dirbomo-propyl)cyanurate, and
(b) tetrabromobisphenol A-bis(2,3-dibromo-2-methylpropyl ether), tetrabromobisphenol S-bis(2,3-dibromo-2-methylpropyl ethyl), or tetrabromobisphenol F-bis(2,3-dibromo-2-methylpropyl ether),
and wherein said composition comprises said mixture in an amount from 0.5 to 10parts by weight per 100 parts by weight of said styrene-based resin.

11. A process for preparing a shaped plastic foam article, comprising melting the composition according to claim 1 in an extruder machine, introducing a blowing agent under pressure into the molten composition, and extruding the molten composition to the atmosphere.

12. A process for preparing a shaped plastic foam article, comprising heating the composition according to claim 1 in the form of beads with steam to allow pre-foaming, and then heating the pre-foamed composition in a mold for fully expanding.

13. The composition according to claim 1, wherein a) is tetrabromobisphenol A-bis(2,3-dibromo-propyl ether), tetrabromobisphenol S-bis(2,3-dibromo-propyl ether), tris(2,3-dibromopropyl)isocyanurate, 2,4,6-tris (2,4,6-tribromophenoxy)-1,3,5-triazine, 1,2-bis(2,4,6-tribromophenoxy)ethane, tetrabromobisphenol A, or poly(pentabromobenzylacrylate).

14. The composition according to claim 1, wherein b) is tetrabromobisphenol A-bis(2,3-dibromo-2-methylpropyl ether).

15. The composition according to claim 1, wherein a) is tetrabromobisphenol A-bis(2,3-dibromo-propyl ether), tetrabromobisphenol S-bis(2,3-dibromo-propyl ether), tris(2,3-dibromopropyl)isocyanurate, 2,4,6-tris (2,4,6-tribromophenoxy)-1,3,5-triazine, 1,2-bis(2,4,6-tribromophenoxy)ethane, tetrabromobisphenol A, or poly(pentabromobenzylacrylate), and b) is tetrabromobisphenol A-bis(2,3-dibromo-2-methylpropyl ether).

16. The composition according to claim 1, wherein a) is tetrabromobisphenol A-bis(2,3-dibromo-propyl ether) and b) is tetrabromobisphenol A-bis (2,3-dibromo-2-methylpropyl ether).

17. The composition according to claim 1, wherein a) is tris(2,3-dibromopropyl)isocyanurate and b) is tetrabromobisphenol A-bis(2,3-dibromo-2-methylpropyl ether).

18. The composition according to claim 1 which comprises said mixture in an amount from 0.5 to 6 parts by weight per 100 parts by weight of said styrene-based resin.

19. The composition according to claim 1 which comprises said mixture in an amount of 3 parts by weight per 100 parts by weight of said styrene-based resin.

20. The composition according to claim 1 wherein said bromine-containing flame-retardant mixture is a mixture of 30 to 90 wt% of (a) and the balance of (b).

21. The composition according to claim 1 wherein said bromine-containing flame-retardant mixture is a mixture of 30 to 80 wt% of (a) and the balance of (b).

22. The composition according to claim 1 which comprises said mixture in an amount from 2 to 8 parts by weight per 100 parts by weight of said styrene-based resin.

* * * * *